United States Patent
Park

(10) Patent No.: US 9,591,714 B2
(45) Date of Patent: Mar. 7, 2017

(54) DC-DC CONVERTER AND ORGANIC LIGHT EMITTING DISPLAY DEVICE INCLUDING THE SAME

(71) Applicant: SAMSUNG DISPLAY CO., LTD., Yongin, Gyeonggi-Do (KR)

(72) Inventor: Sung-Cheon Park, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 346 days.

(21) Appl. No.: 14/487,418

(22) Filed: Sep. 16, 2014

(65) Prior Publication Data

US 2015/0076997 A1    Mar. 19, 2015

(30) Foreign Application Priority Data

Sep. 17, 2013    (KR) .................. 10-2013-0111590

(51) Int. Cl.
| | |
|---|---|
| *H05B 37/02* | (2006.01) |
| *H05B 39/02* | (2006.01) |
| *H05B 39/04* | (2006.01) |
| *H05B 41/36* | (2006.01) |
| *H05B 33/08* | (2006.01) |
| *H02M 1/00* | (2006.01) |

(52) U.S. Cl.
CPC ..... *H05B 33/0896* (2013.01); *H05B 33/0815* (2013.01); *H02M 2001/0025* (2013.01); *H02M 2001/0029* (2013.01)

(58) Field of Classification Search
None
See application file for complete search history.

(56) References Cited

U.S. PATENT DOCUMENTS

| | | | |
|---|---|---|---|
| 8,581,897 B2* | 11/2013 | Park .................. | G09G 3/3406 345/211 |
| 2005/0030082 A1 | 2/2005 | Park | |
| 2011/0205204 A1 | 8/2011 | Park | |
| 2015/0334796 A1* | 11/2015 | Reiter ............... | H05B 33/0845 315/224 |

FOREIGN PATENT DOCUMENTS

| | | |
|---|---|---|
| KR | 10-2005-0015501 | 2/2005 |
| KR | 10-2011-0095592 | 8/2011 |

* cited by examiner

*Primary Examiner* — Anh Tran
(74) *Attorney, Agent, or Firm* — Lee & Morse, P.C.

(57) ABSTRACT

A DC-DC converter includes a voltage conversion circuit unit, a control unit, and a capacitor check unit. The voltage conversion circuit unit converts an input voltage to a first voltage. The control unit controls the voltage conversion circuit unit based on a feedback voltage and a reference voltage. The capacitor check unit determines whether a capacitor is coupled to a capacitor coupling terminal based on sensing a voltage of the capacitor coupling terminal, which is selectively coupled to the first control unit.

20 Claims, 4 Drawing Sheets

DC-DC CONVERTER AND ORGANIC LIGHT EMITTING DISPLAY DEVICE INCLUDING THE SAME

CROSS-REFERENCE TO RELATED APPLICATION

Korean Patent Application No. 10-2013-0111590, filed on Sep. 17, 2013, and entitled, "DC-DC Converter and Organic Light Emitting Display Device Including the Same," is incorporated by reference herein in its entirety.

BACKGROUND

1. Field

One or more embodiments described herein relate to a DC-DC converter and organic light emitting device including the same.

2. Description of the Related Art

A variety of flat panel displays have been developed. Examples include liquid crystal displays, field emission displays, plasma display panels, and organic light emitting displays. These displays are lighter than cathode ray tubes and consume less power.

SUMMARY

In accordance with one embodiment, a DC-DC converter includes a voltage conversion circuit unit configured to convert an input voltage to a first voltage; a first control unit configured to control the voltage conversion circuit unit based on a feedback voltage and a reference voltage; and a capacitor check unit configured to determine whether a capacitor is coupled to a capacitor coupling terminal, the capacitor check unit to determine whether the capacitor is coupled to the capacitor coupling terminal based on sensing a voltage of the capacitor coupling terminal which is selectively coupled to the first control unit.

The capacitor check unit may include a current source configured to supply current to the capacitor coupling terminal; and a second control unit configured to determine that the capacitor is coupled to the capacitor coupling terminal, when the voltage of the capacitor coupling terminal exists within a predetermined range.

The converter may include a first switch coupled between first control unit and the capacitor coupling terminal. The may include a reference voltage supply unit configured to supply the reference voltage to the first control unit. The converter may include a resistor coupled between the first control unit and the reference voltage supply unit. The converter may include a second switch coupled between respective ends of the resistor.

The capacitor check unit may turn on the first switch and turn off the second switch when the capacitor is coupled to the capacitor coupling terminal, and the capacitor check unit may turn off the first switch and turn on the second switch when the capacitor is not coupled to the capacitor coupling terminal.

The reference voltage supply unit may vary the reference voltage based on a reference voltage control signal. The reference voltage supply unit may include a digital logic unit configured to count a number of pulses of the reference voltage control signal; and a digital-analog converter configured to output a reference voltage corresponding to a signal from the digital logic unit indicative of the pulse number.

The converter may include a voltage dividing unit to generate a feedback voltage by dividing the first voltage and to output the feedback voltage to the first control unit.

In accordance with another embodiment, an organic light emitting display device includes a plurality of pixels; and a DC-DC converter configured to supply a first voltage to the pixels, wherein the DC-DC converter includes: voltage conversion circuit unit configured to convert an input voltage to a first voltage; a first control unit configured to control the voltage conversion circuit unit based on a feedback voltage and a reference voltage; and a capacitor check unit configured to determine whether a capacitor is coupled to a capacitor coupling terminal based on sensing a voltage of the capacitor coupling terminal which is selectively coupled to the first control unit.

The capacitor check unit may include a current source configured to supply current to the capacitor coupling terminal; and a second control unit configured to determine that the capacitor is coupled to the capacitor coupling terminal when the voltage of the capacitor coupling terminal exists within a predetermined range.

The DC-DC converter may include a first switch coupled between the first control unit and the capacitor coupling terminal. The DC-DC converter may include a reference voltage supply unit configured to supply the reference voltage to the first control unit. The DC-DC converter may include a resistor coupled between the first control unit and the reference voltage supply unit. The DC-DC converter may include a second switch coupled between respective ends of the resistor.

The capacitor check unit may turn on the first switch and turn off the second switch when the capacitor is coupled to the capacitor coupling terminal, and the capacitor check unit may turn off the first switch and turn on the second switch when the capacitor is not coupled to the capacitor coupling terminal.

The reference voltage supply unit may vary the reference voltage based on a reference voltage control signal. The reference voltage supply unit may include a digital logic unit configured to count a number of pulses of the reference voltage control signal; and a digital-analog converter configured to output a reference voltage based on a signal supplied from the digital logic unit indicative of the pulse number.

The DC-DC converter may include a voltage dividing unit configured to generate a feedback voltage by dividing the first voltage and to supply the feedback voltage to the first control unit.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
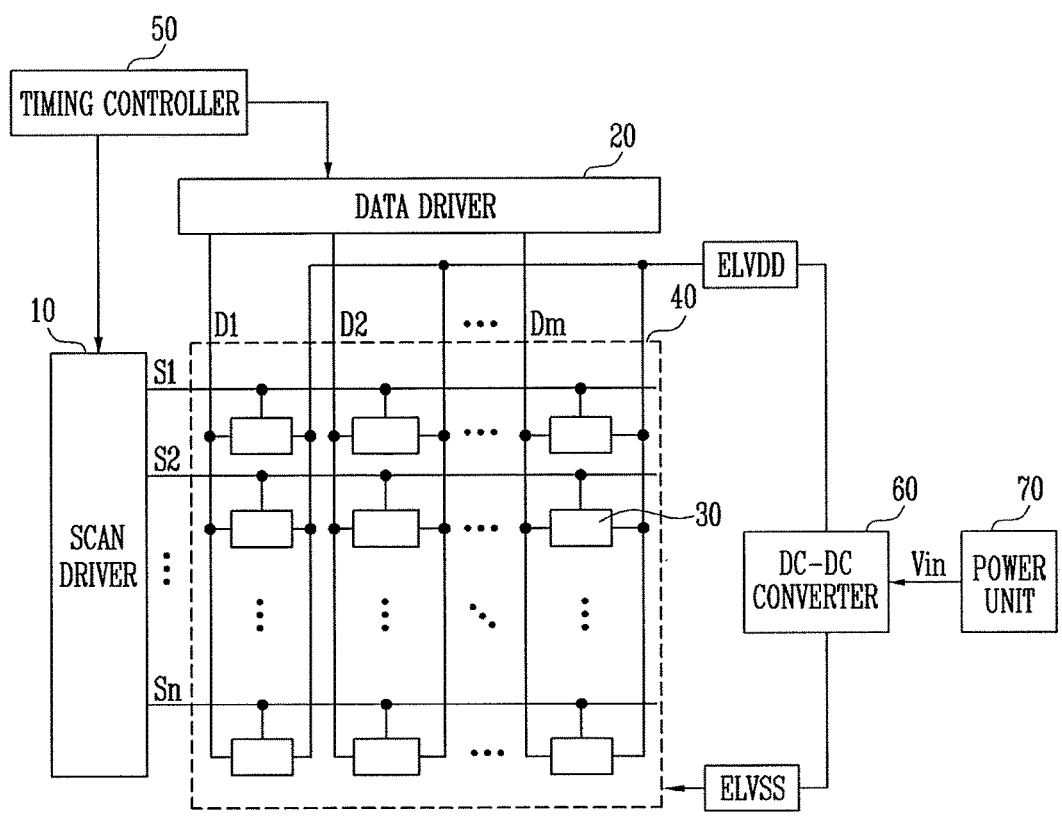
FIG. 1 illustrates an embodiment of an organic light emitting display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Hereinafter, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

FIG. 1 illustrates an embodiment of an organic light emitting display device which includes a pixel unit 20, a scan driver 30, a data driver 40, and a DC-DC converter 60. The pixel unit 20 includes a plurality of pixels 10 coupled to scan lines S1 to Sn and data lines D1 to Dm. The scan driver 30 supplies a scan signal to pixels 10 through corresponding scan lines S1 to Sn. The data driver 40 supplies data signals to pixels 10 through respective data lines D1 to Dm. The DC-DC converter 60 supplies first and second voltages ELVDD and ELVSS to each pixel 10. The organic light emitting display device also includes a timing controller 50 to control the scan driver 30 and the data driver 40.

Each pixel 10 receives first and second voltages ELVDD and ELVSS from DC-DC converter 60, and generates light corresponding to a data signal based on current flowing from first voltage ELVDD to second voltage ELVSS via an organic light emitting diode.

The scan driver 30 generates a scan signal under control of timing controller 50, and supplies the scan signal to scan lines S1 to Sn.

The data driver 40 generates data signals under control of timing controller 50, and supplies the data signals to respective ones of the data lines D1 to Dm. When the scan signal is supplied to a specific scan line, the pixels 10 coupled to the specific scan line receive a data signal from corresponding ones of the data lines D1 to Dm.

The DC-DC converter 60 receives an input voltage Vin from a power unit 70, and generates first and second voltages ELVDD and ELVSS to be supplied to each pixel 10 based on a conversion of input voltage Vin. The first voltage ELVDD may be a positive voltage and the second voltage ELVSS may be a negative voltage. The power unit 70 may be a battery which provides DC power, or may be a rectifying device that converts AC power into DC power.

Figure 2:
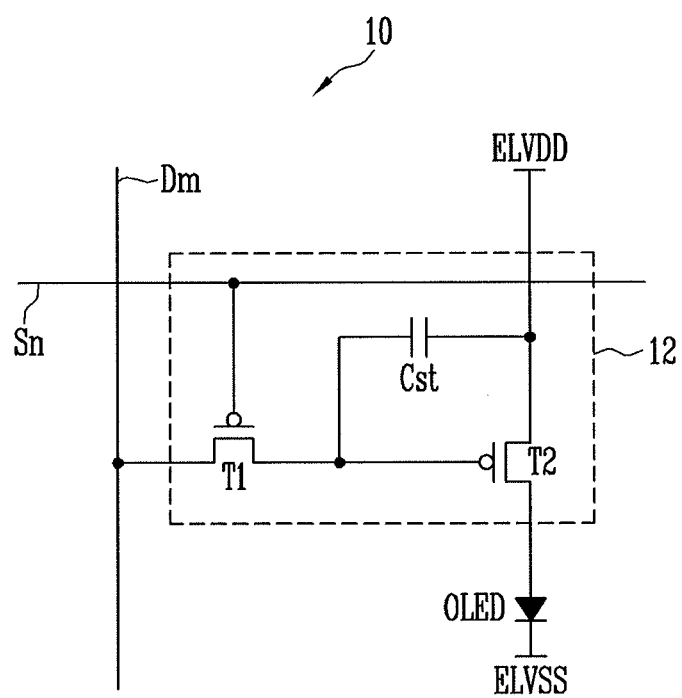
FIG. 2 illustrates an embodiment of a pixel.

FIG. 2 illustrates an embodiment of a pixel, which, for example, may be the pixel 10 shown in FIG. 1. For illustrative purposes only, the pixel in FIG. 2 is shown coupled to an n-th scan line Sn and an m-th data line Dm.

Referring to FIG. 2, the pixel 10 includes a pixel circuit 12, coupled to the data line Dm and the scan line Sn, for controlling an organic light emitting diode (OLED). An anode electrode of the OLED is coupled to the pixel circuit 12, and a cathode electrode of the OLED is coupled to second voltage ELVSS. The OLED generates light with a luminance corresponding to current supplied from the pixel circuit 12.

The pixel circuit 12 controls the amount of current supplied to the OLED, based on a data signal supplied to the data line Dm, when a scan signal is supplied to the scan line Sn. The pixel circuit 12 includes a second transistor T2 coupled between first voltage ELVDD and the OLED, a first transistor T1 coupled among the second transistor T2, the data line Dm, and the scan line Sn, and a storage capacitor Cst coupled between a gate electrode and a first electrode of the second transistor T2.

A gate electrode of the first transistor T1 is coupled to the scan line Sn, and a first electrode of the first transistor T1 is coupled to the data line Dm. A second electrode of the first transistor T1 is coupled to one terminal of the storage capacitor Cst. The first and second electrodes are source and drain electrodes. For example, if the first electrode is the source electrode, the second electrode may is the drain electrode.

The first transistor T1 coupled to the scan line Sn and the data line Dm is turned on when the scan signal is supplied from scan line Sn. When the first transistor T1 turns on, a data signal is supplied from the data line Dm to storage capacitor Cst. The storage capacitor Cst charges a voltage corresponding to the data signal.

A gate electrode of the second transistor T2 is coupled to a first terminal of the storage capacitor Cst. A first electrode of the second transistor T2 is coupled to a second terminal of the storage capacitor Cst and the first voltage ELVDD. A second electrode of the second transistor T2 is coupled to the anode electrode of the OLED.

The second transistor T2 controls the amount of current flowing from the first voltage ELVDD to the second voltage ELVSS, via the OLED, based on the voltage stored in the storage capacitor Cst. The OLED generates light corresponding to the amount of current supplied from the second transistor T2. The oixel 10 may have a structure different from FIG. 2 when incorporated into the display device of FIG. 1.

Figure 3:
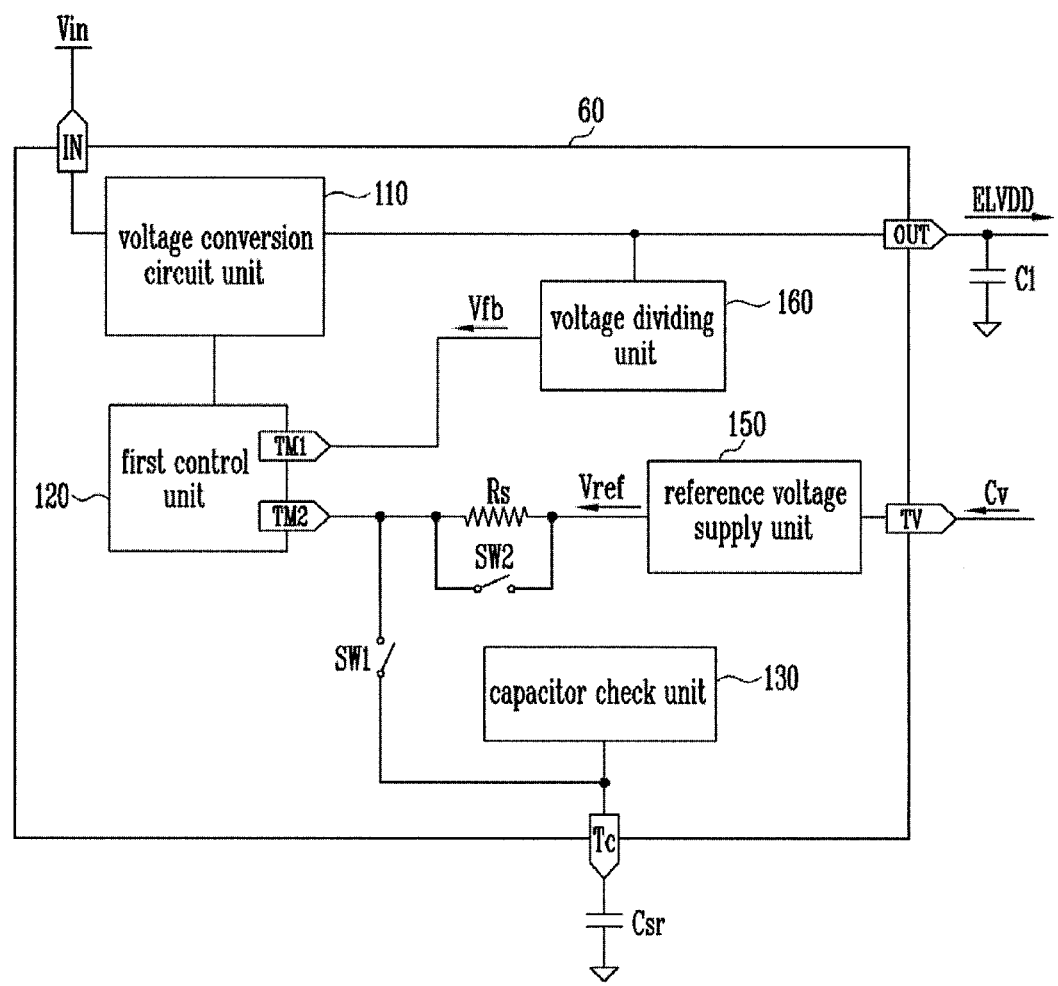
FIG. 3 illustrates an embodiment of a DC-DC converter.
Figure 4:
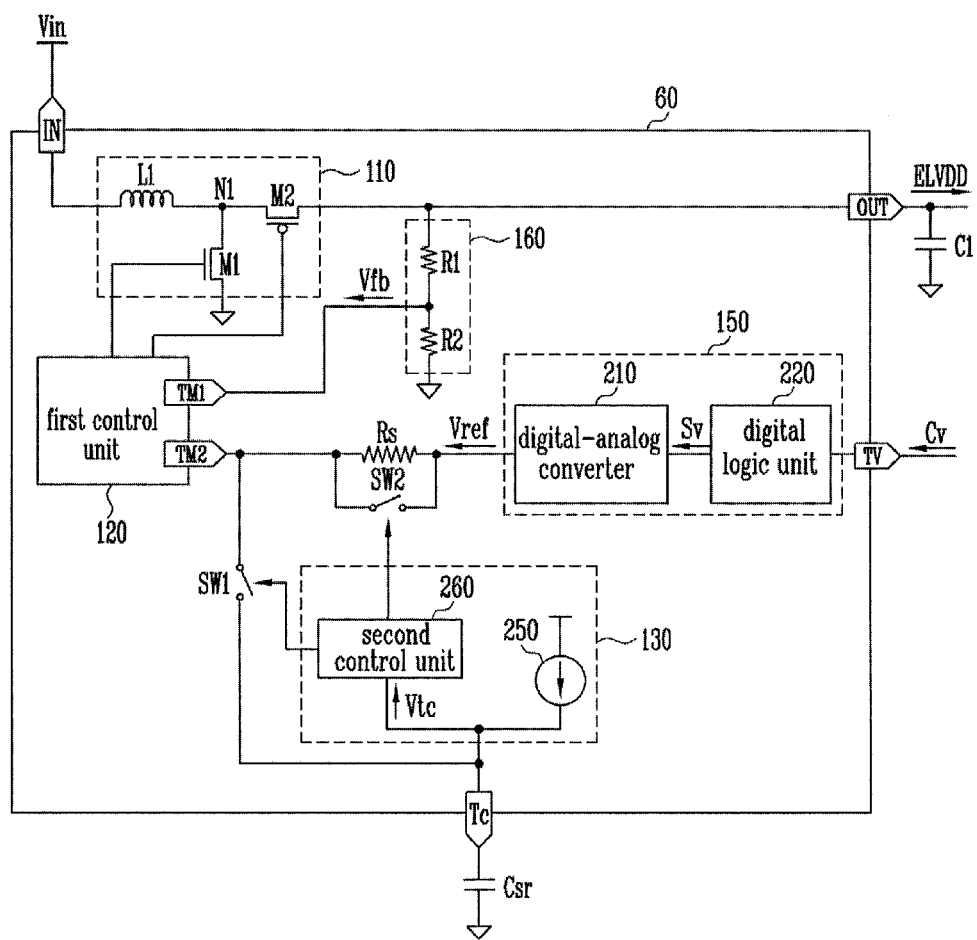
FIG. 4 illustrates a more detailed embodiment of the DC-DC converter.

FIG. 3 illustrates an embodiment of a DC-DC converter, which, for example, may correspond to the DC-DC converter 60 in FIG. 1. FIG. 4 illustrates a more detailed view of this converter.

Referring to FIG. 3, the DC-DC converter 60 includes a voltage conversion circuit unit 110, a first control unit 120, and a capacitor check unit 130. The voltage conversion circuit unit 110 converts input voltage Vin supplied from an external source to first voltage ELVDD. The voltage conversion circuit unit 110 may be, for example, a boost-type converter and may generate the first voltage ELVDD to have the positive voltage. The voltage conversion circuit unit 110 converts input voltage Vin received from input terminal IN to the first voltage ELVDD, and outputs the first voltage ELVDD to an output terminal OUT.

Referring to FIG. 4, in one embodiment, the voltage conversion circuit unit 110 may include a first inductor L1, a first transistor M1, and a second transistor M2 to perform a voltage boosting operation. The first inductor L1 is coupled between a first node N1 and input terminal N1, through which the input voltage Vin is received. The first transistor M1 is coupled between the first node N1 and ground or another reference potential. The second transistor M2 is coupled between the first node N1 and the output terminal OUT. The first node N1 may be a common node of the first inductor L1, the first transistor M1, and the second transistor M2.

The circuit configuration of the voltage conversion circuit unit 110 in FIG. 4 is merely one embodiment. A voltage conversion circuit unit having a different structure may be used in FIG. 3.

Referring to FIG. 3, the output capacitor C1 may be coupled to output terminal OUT of the DC-DC converter 60.

The first control unit 120 may have a first terminal TM1 to receive a feedback voltage Vfb and a second terminal TM2 to receive a reference voltage Vref. The first control unit 120 controls the voltage conversion circuit unit 110, based on feedback voltage Vfb and reference voltage Vref. For example, the first control unit 120 may control the on-off state of one or more transistors (e.g., first and second transistors M1 and M2) in the voltage conversion circuit unit 110, so that the input voltage Vin is converted to the first voltage ELVDD at a desired voltage level.

The capacitor check unit 130 checks whether a capacitor Csr for slew rate control is coupled to a capacitor coupling terminal Tc. The capacitor check unit performs this function by sensing a voltage Vtc of the capacitor coupling terminal Tc, which can be electrically coupled to the second terminal TM2 of the first control unit 120. The capacitor check unit 130 may include a current source 250 and a second control unit 260, as illustrated in FIG. 4.

The current source 250 supplies a predetermined current to the capacitor coupling terminal Tc. As a result, a predetermined voltage is applied to the capacitor coupling terminal Tc. The second control unit 260 senses a voltage Vtc of the capacitor coupling terminal Vtc.

When the sensed voltage Vtc exists within a predetermined range, the second control unit 260 decides that the capacitor Csr is coupled to the capacitor coupling terminal Tc. For example, when the voltage Vtc of the capacitor coupling terminal Tc is lower than a predetermined first comparison voltage V1, the second control unit 260 may determine that the capacitor coupling terminal Tc is coupled to ground.

When the voltage Vtc of the capacitor coupling terminal Tc is greater than a predetermined second comparison voltage V2, the second control unit 260 may determine that the capacitor coupling terminal Tc is in a floating state.

When the voltage Vtc of the capacitor coupling terminal Tc is greater than the first comparison voltage V1 and lower than the second comparison voltage V2, the second control unit 260 may decide that the capacitor Csr is coupled to the capacitor coupling terminal Tc. In one embodiment, the first comparison voltage V1 may be less than the second comparison voltage V2.

The DC-DC converter 60 may include a first switch SW1 coupled between the second terminal TM2 of the first control unit 120 and the capacitor coupling terminal Tc. When the first switch SW1 is turned on, the second terminal TM2 of the first control unit 120 may be electrically coupled to the capacitor coupling terminal Tc.

Accordingly, when the first switch SW1 is turned on at a time when the capacitor Csr is coupled to the capacitor coupling terminal Tc, the capacitor Csr may be electrically coupled to the second terminal TM2 of the first control unit 120. When the first switch SW1 is turned off, the second terminal TM2 of the first control unit 120 and the capacitor coupling terminal Tc may be electrically decoupled from each other.

The DC-DC converter 60 may include a reference voltage supply unit 150 to the supply reference voltage Vref to the second terminal TM2 of first control unit 120. The reference voltage supply unit 150 may vary the reference voltage Vref, corresponding to a reference voltage control signal Cv supplied through a control terminal Tv.

Referring to FIG. 4, the reference voltage supply unit 150 may include a digital logic unit 220 and a digital-analog (D/A) converter 210. The digital logic unit 220 generates a control signal Sv corresponding to the reference voltage control signal Cv supplied from an external source. The control signal Sv is supplied to the digital-analog converter 210. For example, the digital logic unit 220 counts a number of pulses of the reference voltage control signal Cv, and generates the control signal Sv based on the pulse number. The control signal Sv is then supplied to the digital-analog converter 210.

The digital-analog converter 210 outputs a reference voltage Vref corresponding to the control signal Sv from the digital logic unit 220. A resistor Rs and a second switch SW2 may be positioned between the second terminal TM2 of the first control unit 120 and the reference voltage supply unit 150. The second switch SW2 is coupled between respective ends of resistor Rs. Accordingly, the second switch SW2 may be coupled in parallel to the resistor Rs.

When the second switch SW2 turns on, the reference voltage Vref is supplied to the first control unit 120. When the second switch SW2 turns off, the reference voltage Vref is supplied to the first control unit 120 through the resistor Rs.

Referring to FIG. 4, one end of each of the resistor Rs and the second switch SW2 is coupled to the second terminal TM2 of the first control unit 120. The other end of each of the resistor Rs and the second switch SW2 is coupled to the digital-analog converter 210 of the reference voltage supply unit 150.

The DC-DC converter 60 may include a voltage dividing unit 160 to supply a feedback voltage Vfb to the first terminal TM1 of the first control unit 120. The voltage dividing unit 160 generates feedback voltage Vfb by dividing the first voltage ELVDD. For example, the voltage dividing unit 160 may be coupled to the output terminal OUT and may divide the voltage (e.g., first voltage ELVDD) of the output terminal OUT. The voltage dividing unit 160 may include, for example, a plurality of resistors R1 and R2 coupled in series.

The first control unit 120 performs pulse width modulation (PWM) control on voltage conversion circuit unit 110, using feedback voltage Vfb supplied from the voltage dividing unit 160 and the reference voltage Vref supplied from the reference voltage supply unit 150. When the reference voltage Vref varies, the first voltage ELVDD output from the voltage conversion circuit unit 110 also changes. In this case, the variation time of the reference voltage Vref is controlled, thereby controlling the variation time of the first voltage ELVDD.

When the capacitor Csr is coupled to the capacitor coupling terminal Tc, the capacitor check unit 130 detects coupling of the capacitor Csr through the operation described above. When it is determined that the capacitor Csr is coupled to the capacitor coupling terminal Tc, the capacitor check unit 130 turns on the first switch SW1 and turns off the second switch SW2.

As a result, an RC delay (based on resistor Rs and capacitor Csr) occurs in reference voltage Vref supplied from reference voltage supply unit 150. Accordingly, the slew rate of reference voltage Vref is reduced, and the slew rate of first voltage ELVDD is also lowered.

When the capacitor Csr is not coupled to the capacitor coupling terminal Tc, the capacitor check unit 130 may detect non-coupling of the capacitor Csr through the operation described above. When it is determined that the capacitor Csr is not coupled to the capacitor coupling terminal Tc, the capacitor check unit 130 turns off the first switch SW1 and turns on the second switch SW2.

Thus, the RC delay (based on resistor Rs and capacitor Csr) disappears. As a result, it is possible to restore the slew rates of the reference voltage Vref and the first voltage ELVDD.

However, there may exist a case where it is unnecessary to use the capacitor Csr even when the capacitor Csr is coupled to the capacitor coupling terminal Tc. In this case, a separate switch control signal (e.g., provided from an external source) is supplied to the digital logic unit 220 of the reference voltage supply unit 150. As a result, it is possible to turn off the first switch SW1 and to turn on the second switch SW2, even when the capacitor Csr is coupled to the capacitor coupling terminal Tc.

That is, the digital logic unit 220 may receive a switch control signal and supply a signal corresponding to the switch control signal to the capacitor check unit 130, in order to turn off the first switch SW1 and turn on the second switch SW2.

The first and second switches SW1 and SW2 may be implemented, for example, by transistors. The on-off states of the first and second switches SW1 and SW2 may be controlled by the second control unit 260 of the capacitor check unit 130. In this case, the first and second switches SW1 and SW2 may be alternately turned on.

Although not shown in FIGS. 3 and 4, another voltage conversion circuit unit may be included in the DC-DC converter 60. This voltage conversion circuit may convert the input voltage Vin to a second voltage ELVSS, and may output the converted second voltage ELVSS.

By way of summation and review, an organic light emitting display device includes a DC-DC converter which generates power sources for driving the display device by converting an external power source. One or more of the aforementioned embodiments may reduce power consumption by varying a voltage output from the DC-DC converter. A capacitor may be included in the DC-DC converter in order to control the slew rate of the voltage output from the DC-DC converter.

Thus, according to one or more of the aforementioned embodiments, a DC-DC converter and organic light emitting display device is provided that checks whether a capacitor for slew rate control is coupled. Further, a DC-DC converter and organic light emitting display device is provided that controls whether a capacitor for slew rate control is used.

The methods and processes described herein may be performed by code or instructions to be executed by a computer, processor, or controller. Because the algorithms that form the basis of the methods are described in detail, the code or instructions for implementing the operations of the method embodiments may transform the computer, processor, or controller into a special-purpose processor for performing the methods described herein.

Also, another embodiment may include a computer-readable medium, e.g., a nontransitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A DC-DC converter, comprising:
   a voltage conversion circuit unit to convert an input voltage to a first voltage;
   a first control unit to control the voltage conversion circuit unit based on a feedback voltage and a reference voltage; and
   a capacitor check unit to determine whether a capacitor is coupled to a capacitor coupling terminal, the capacitor check unit to determine whether the capacitor is coupled to the capacitor coupling terminal based on sensing a voltage of the capacitor coupling terminal which is selectively coupled to the first control unit.

2. The converter as claimed in claim 1, wherein the capacitor check unit includes:
   a current source to supply current to the capacitor coupling terminal; and
   a second control unit to determine that the capacitor is coupled to the capacitor coupling terminal, when the voltage of the capacitor coupling terminal exists within a predetermined range.

3. The converter as claimed in claim 1, further comprising:
   a first switch coupled between first control unit and the capacitor coupling terminal.

4. The converter as claimed in claim 3, further comprising a reference voltage supply unit configured to supply the reference voltage to the first control unit.

5. The converter as claimed in claim 4, further comprising:
   a resistor coupled between the first control unit and the reference voltage supply unit.

6. The converter as claimed in claim 5, further comprising:
   a second switch coupled between respective ends of the resistor.

7. The converter as claimed in claim 6, wherein:
   the capacitor check unit turns on the first switch and turns off the second switch when the capacitor is coupled to the capacitor coupling terminal, and
   the capacitor check unit turns off the first switch and turns on the second switch when the capacitor is not coupled to the capacitor coupling terminal.

8. The converter as claimed in claim 4, wherein the reference voltage supply unit varies the reference voltage based on a reference voltage control signal.

9. The converter as claimed in claim 8, wherein the reference voltage supply unit includes:
   a digital logic unit to count a number of pulses of the reference voltage control signal; and
   a digital-analog converter to output a reference voltage corresponding to a signal from the digital logic unit indicative of the pulse number.

10. The converter as claimed in claim 1, further comprising:
    a voltage dividing unit to generate a feedback voltage by dividing the first voltage and to output the feedback voltage to the first control unit.

11. An organic light emitting display device, comprising:
    a plurality of pixels; and
    a DC-DC converter to supply a first voltage to the pixels, wherein the DC-DC converter includes:
       a voltage conversion circuit unit to convert an input voltage to a first voltage;

a first control unit to control the voltage conversion circuit unit based on a feedback voltage and a reference voltage; and a capacitor check unit to determine whether a capacitor is coupled to a capacitor coupling terminal based on sensing a voltage of the capacitor coupling terminal which is selectively coupled to the first control unit.

12. The display device as claimed in claim 11, wherein the capacitor check unit includes:

a current source to supply current to the capacitor coupling terminal; and a second control unit to determine that the capacitor is coupled to the capacitor coupling terminal when the voltage of the capacitor coupling terminal exists within a predetermined range.

13. The display device as claimed in claim 11, wherein the DC-DC converter includes a first switch coupled between the first control unit and the capacitor coupling terminal.

14. The display device as claimed in claim 13, wherein the DC-DC converter includes a reference voltage supply unit to supply the reference voltage to the first control unit.

15. The organic light emitting display device as claimed in claim 14, wherein the DC-DC converter includes a resistor coupled between the first control unit and the reference voltage supply unit.

16. The display device as claimed in claim 15, wherein the DC-DC converter includes a second switch coupled between respective ends of the resistor.

17. The display device as claimed in claim 16, wherein:

the capacitor check unit turns on the first switch and turns off the second switch when the capacitor is coupled to the capacitor coupling terminal, and the capacitor check unit turns off the first switch and turns on the second switch when the capacitor is not coupled to the capacitor coupling terminal.

18. The display device as claimed in claim 14, wherein the reference voltage supply unit varies the reference voltage based on a reference voltage control signal.

19. The display device as claimed in claim 18, wherein the reference voltage supply unit includes:

a digital logic unit to count a number of pulses of the reference voltage control signal; and a digital-analog converter to output a reference voltage based on a signal supplied from the digital logic unit indicative of the pulse number.

20. The display device as claimed in claim 11, wherein the DC-DC converter includes a voltage dividing unit to generate a feedback voltage by dividing the first voltage and to supply the feedback voltage to the first control unit.

* * * * *